US012669370B2

(12) United States Patent

Ding et al.

(10) Patent No.: US 12,669,370 B2

(45) Date of Patent: Jun. 30, 2026

(54) JOINT COMMUNICATION AND SENSING FOR FALLEN TREE LOCALIZATION ON OVERHEAD LINES

(71) Applicant: NEC Laboratories America, Inc., Princeton, NJ (US)

(72) Inventors: Yangmin Ding, East Brunswick, NJ (US); Zhuocheng Jiang, Plainsboro, NJ (US); Sarper Ozharar, Pennington, NJ (US); Yue Tian, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 292 days.

(21) Appl. No.: 18/501,203

(22) Filed: Nov. 3, 2023

(65) Prior Publication Data

US 2024/0085238 A1 Mar. 14, 2024

Related U.S. Application Data

(60) Provisional application No. 63/516,585, filed on Jul. 31, 2023, provisional application No. 63/422,287, filed on Nov. 3, 2022.

(51) Int. Cl.
*G01D 5/353* (2006.01)
*G01H 9/00* (2006.01)

(52) U.S. Cl.
CPC ......... *G01H 9/004* (2013.01); *G01D 5/35361* (2013.01)

(58) Field of Classification Search
CPC . G01H 9/004; G01D 5/35361; G01D 5/35364
See application file for complete search history.

(56) References Cited

U.S. PATENT DOCUMENTS

| | | | | |
|---|---|---|---|---|
| 2013/0028555 A1* | 1/2013 | Dailey | .............. | G01D 5/35316 |
| | | | | 385/12 |
| 2017/0146409 A1* | 5/2017 | Hadley | .................... | G01K 3/10 |
| 2020/0313763 A1* | 10/2020 | Wang | .............. | H04B 10/25753 |
| 2021/0318166 A1* | 10/2021 | Ding | ..................... | G01H 9/004 |

(Continued)

FOREIGN PATENT DOCUMENTS

| | | | | |
|---|---|---|---|---|
| CN | 113049084 A | * | 6/2021 | ............. G06N 3/045 |

OTHER PUBLICATIONS

Machine translation of CN113049084 (Year: 2021).*

*Primary Examiner* — David J Bolduc

(74) *Attorney, Agent, or Firm* — Vincent Duffy

(57) ABSTRACT

In sharp contrast to the prior art, a fallen tree detection and localization method based on distributed fiber optical sensing (DFOS) technique and physics informed machine learning is described in which DFOS leverages existing fiber cables that are conventionally installed on the bottom layer of distribution lines and used to provide high-speed communications. The DFOS collects and transmits fallen tree induced vibration data along the length of the entire overhead lines, including distribution lines and transmission lines, where there is a fiber cable deployed. The developed physics-informed neural network model processes the data and localizes the fallen tree location along the lines. The location is interpreted in at least two aspects: the fallen tree location in terms of the fiber cable length; and the exact cable location (power cable or fiber cable) that the fallen tree mechanically impacts.

5 Claims, 12 Drawing Sheets

(56)        References Cited

U.S. PATENT DOCUMENTS

| 2021/0405232 A1* | 12/2021 | LeBlanc | G01V 1/226 |
| 2022/0120925 A1* | 4/2022 | Tian | G01V 1/001 |
| 2022/0196462 A1* | 6/2022 | Han | G06N 7/01 |
| 2022/0329052 A1* | 10/2022 | Ding | G01D 5/35354 |

* cited by examiner

DAC: Digital-to-analog converter
ADC: Analog-to-digital converter
DSP: Digital signal processing
WDM: Wavelength division multiplexer
BPF: Band-pass filter
LPF: Low-pass filter

JOINT COMMUNICATION AND SENSING FOR FALLEN TREE LOCALIZATION ON OVERHEAD LINES

CROSS-REFERENCE TO RELATED APPLICATIONS

This application claims the benefit of U.S. Provisional Patent Application Ser. No. 63/422,287 filed Nov. 3, 2022, the entire contents of which is incorporated by reference as if set forth at length herein.

FIELD OF THE INVENTION

This application relates to distributed fiber optic sensing (DFOS) systems, methods, and structures. More particularly, this application pertains to fallen tree localization on overhead lines using distributed fiber optic sensing (DFOS).

BACKGROUND OF THE INVENTION

Environmental factors such as extreme weather, trees, and animals are major causes of service interruptions and declining reliability in electric utility distribution systems. Among these factors, trees, particularly fallen trees, or limbs have the most significant impact on overhead distribution lines. Extreme storms, droughts, disease, and insects are stressing and killing trees, which subsequently crashed into electric lines, posing a growing threat to wildfires and grid reliability. To hasten the restoration of electrical service and shorten the duration of power outages, fast and accurate downed tree detection and localization on distribution line is critical. This reduces electrical hazards and improves grid reliability.

Typically, trees cause interruption of the electric utility distribution system in one of two ways, an electric short circuit (electrical mode) or physical damage to the system (mechanical mode). Electrical mode mechanisms include wet trees and branches falling on power lines pushing conductors together. Contact from a phase conductor to a tree frequently results in low short circuit current magnitude due to the high impedance at the point of contact and the long current path through the tree. Mechanical mode mechanisms include trees falling onto power lines and laying on conductors. In such cases, some conductors may remain intact or may fall to the ground onto certain surfaces and not establish a conducting path sufficient to create a full short circuit. Therefore, in both the electrical and mechanical mechanisms, depending on the fault impedance, the fault may not produce enough current to be detected by conventional protection, such as circuit breakers, overcurrent relays, and automatic circuit reclosers (ACRs). Furthermore, a recloser may operate to clear the immediate short circuit from a tree contact. Still, the offending vegetation can remain in contact with or near energized conductors and result in additional interruptions, outages, and other future problems. Moreover, with the increasing penetration of distributed energy resources (DERs) into the electrical utility distribution grid, downed tree-related line outage detection relies on advanced metering infrastructure (AMI), or customer reporting might not be practically feasible. In cases like this, when feeders or customers are disconnected from the grid(s), the customers can still receive power from the rooftop solar, battery storage, and EVs, leaving the downed tree onto power lines unreported.

SUMMARY OF THE INVENTION

The above problems are solved and an advance in the art in is made according to aspects of the present disclosure directed to fallen tree localization on overhead lines using distributed fiber optic sensing (DFOS).

In sharp contrast to the prior art, a fallen tree detection and localization method based on distributed fiber optical sensing (DFOS) technique and physics informed machine learning is described in which DFOS leverages existing fiber cables that are conventionally installed on the bottom layer of distribution lines and used to provide high-speed communications. The DFOS collects and transmits fallen tree induced vibration data along the length of the entire overhead lines, including distribution lines and transmission lines, where there is a fiber cable deployed. The developed physics-informed neural network model processes the data and localizes the fallen tree location along the lines. The location is interpreted in at least two aspects: the fallen tree location in terms of the fiber cable length; and the exact cable location (power cable or fiber cable) that the fallen tree mechanically impacts.

In further contrast to most existing methods that rely solely on electrical output for tree-related fault detection, our inventive method is vibration-based and advantageously enables detection of a fallen tree when it strikes a cable even if a short circuit is not triggered.

As opposed to conventional approaches that depend on sensors placed along the length of the power line at predetermined points, our distributed sensing technique leverages the cable itself to sense the environment and monitors the entire distribution line in real-time without adding sensors, field power, and additional communication channels.

Finally, a physics-informed neural network model considers the physical characteristics of the distribution systems and pinpoints the exact location of the fallen tree.

BRIEF DESCRIPTION OF THE DRAWING

FIG. 8(A), FIG. 8(B), and FIG. 8(C) are a series of test plots showing singular value decomposition (SVD) for each test for: FIG. 8(A) ambient, FIG. 8(B) primary wire, and FIG. 8(C) aerial fiber cable II according to aspects of the present disclosure.

DETAILED DESCRIPTION OF THE INVENTION

Figure 1A:
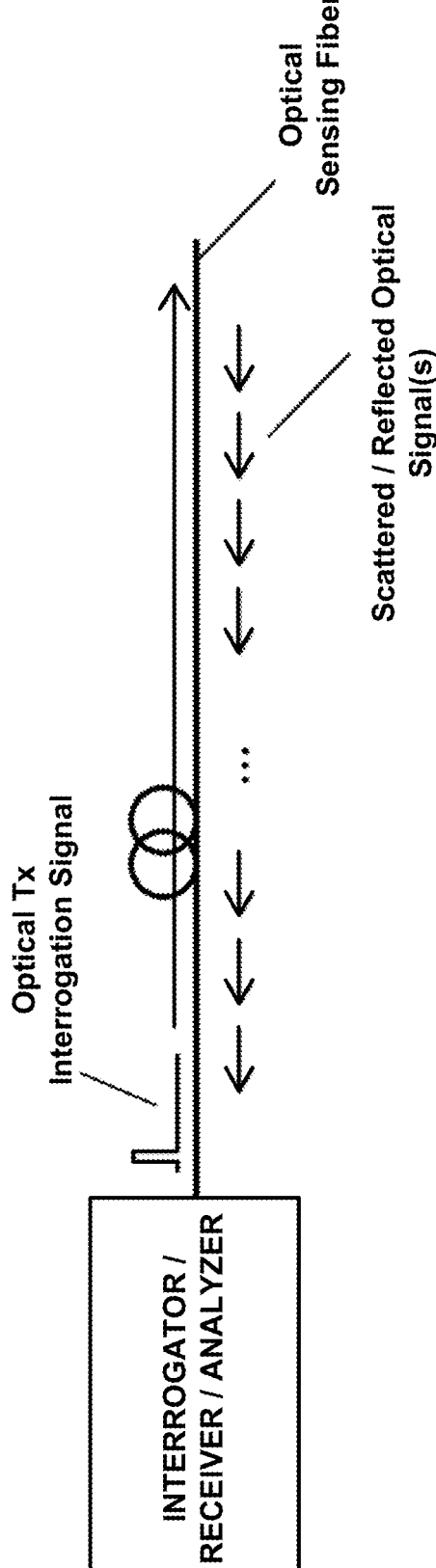
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
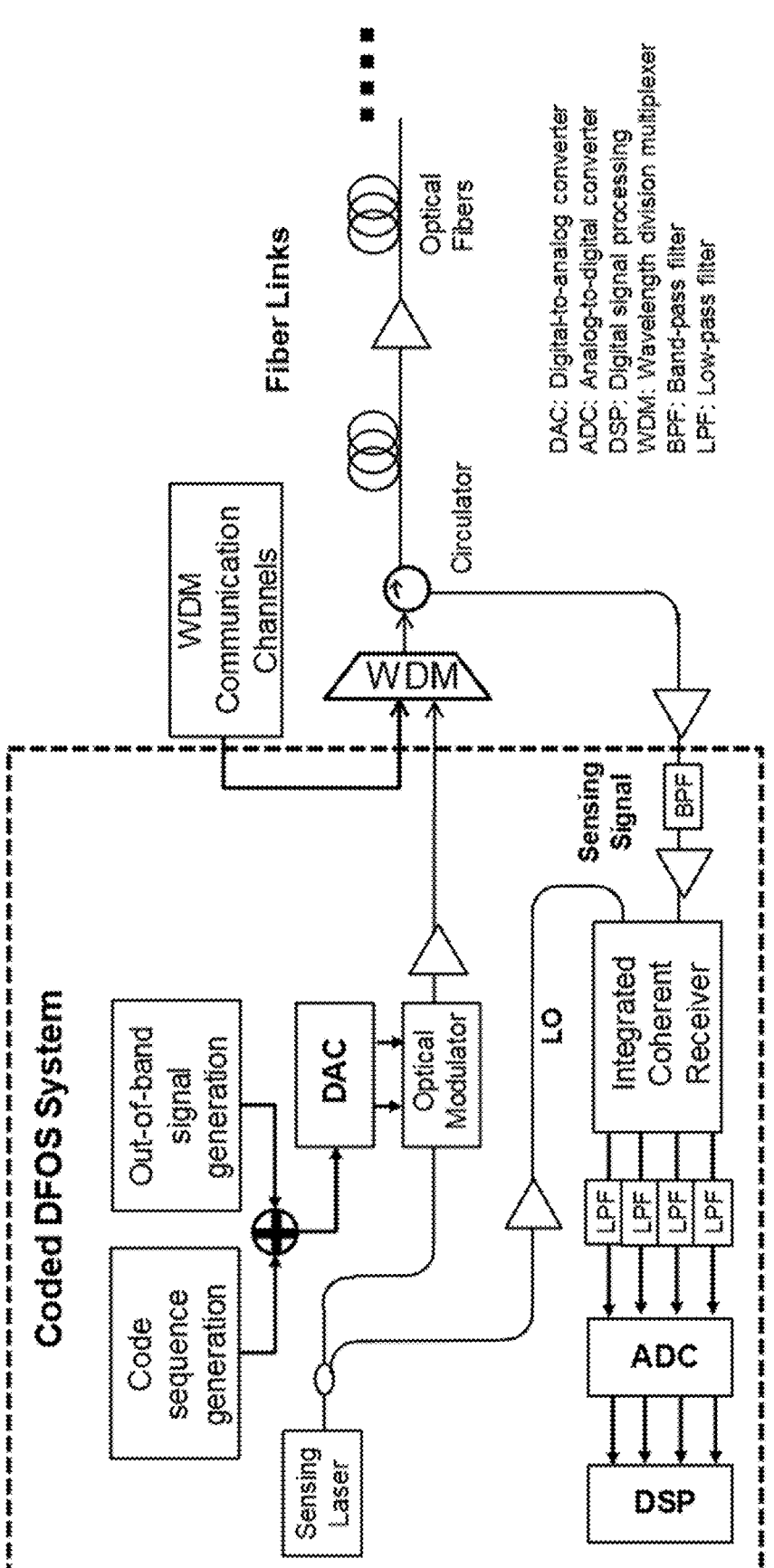
Figure 2:
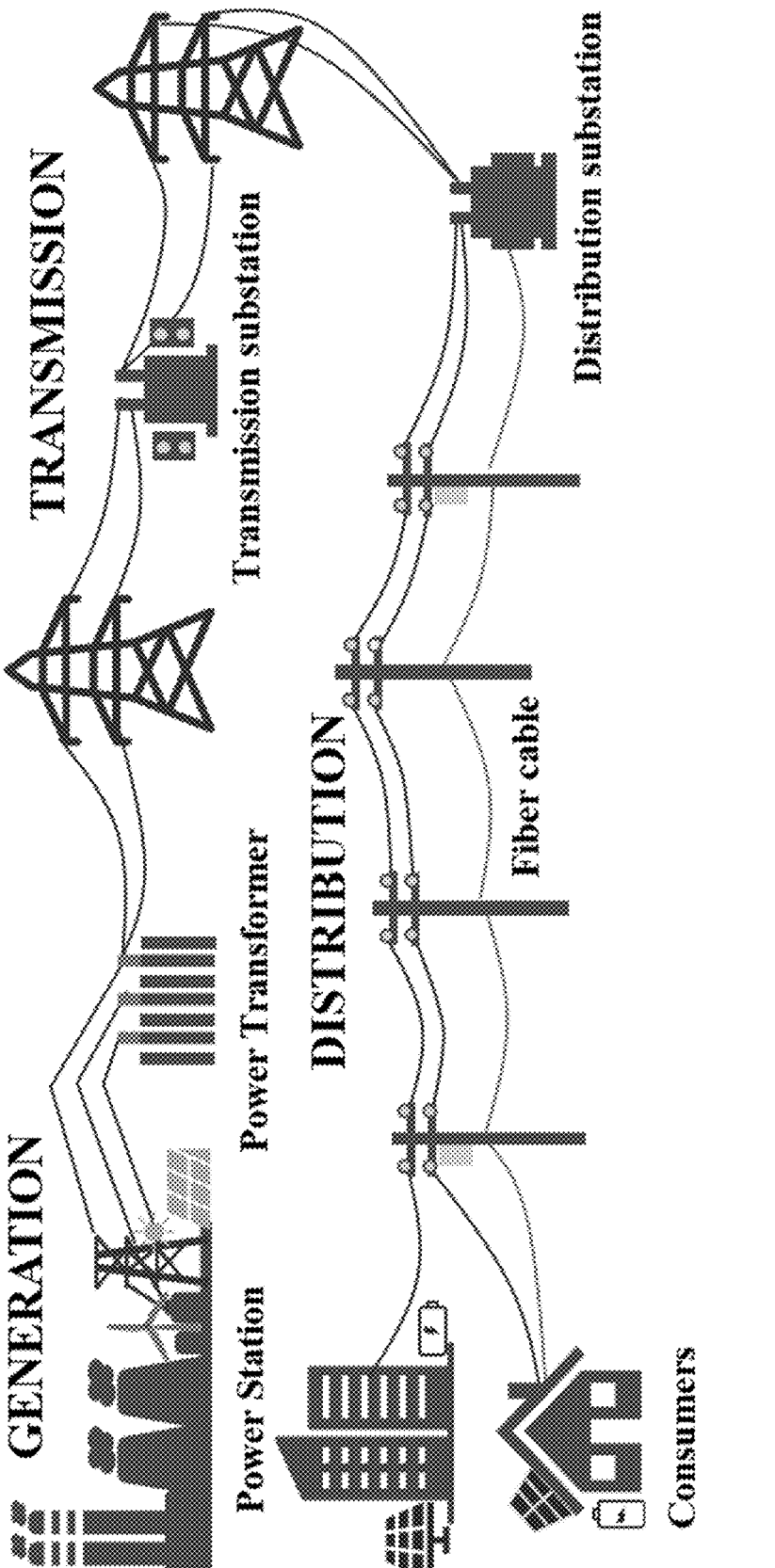
FIG. 2. Is a schematic diagram showing an illustrative overview of the electrical power distribution system according to aspects of the present disclosure.

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. According to aspects of the present disclosure, classification methods may be further used to detect and locate events or other environmental conditions including acoustic and/or vibrational and/or thermal along the length of the optical sensing fiber.

Figure 3:
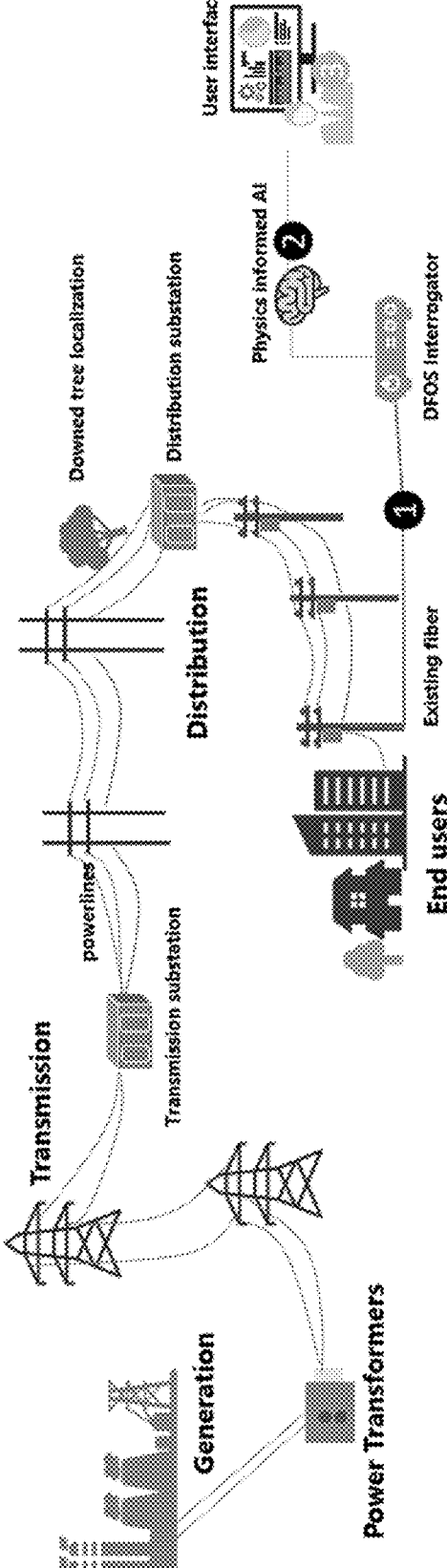
FIG. 3 is a schematic diagram showing illustrative features of our inventive approach according to aspects of the present disclosure.

FIG. 3 is a schematic diagram showing illustrative features of our inventive approach according to aspects of the present disclosure;

As shown in this figure, systems, methods, and structures according to aspects of the present disclosure may include: 1) vibration sensing using Rayleigh backscatter; 2) physics informed AI model for fallen tree localization; and 3) graphical user interface (GUI) for visualization and reporting.

Vibration Sensing Using Rayleigh Backscatter

In distributed acoustic sensing, the ambient physical field is obtained by the coherent Rayleigh backscattering of probe laser in optical sensing fiber cable. According to physical effects (elasto-optical effect, thermos-optical effect, thermal expansion, etc.), the ambient physical field affects the features of optical sensing fiber cable (amplitude, phase, frequency, etc.). Once these features are detected and demodulated, the physical field can be obtained, and the sensing is achieved at each position along the optical sensing fiber cable.

We note that we may generally use the terms optical sensing fiber, sensing fiber, fiber, and cable somewhat interchangeably. We note further that a cable will generally include a plurality of individual optical fibers that individually may be employed as an optical sensor fiber. Accordingly, an optical fiber that is interrogated by an interrogator is a sensor fiber, and there may be many of such sensor fibers co-located within a single optical fiber cable.

Figure 4:
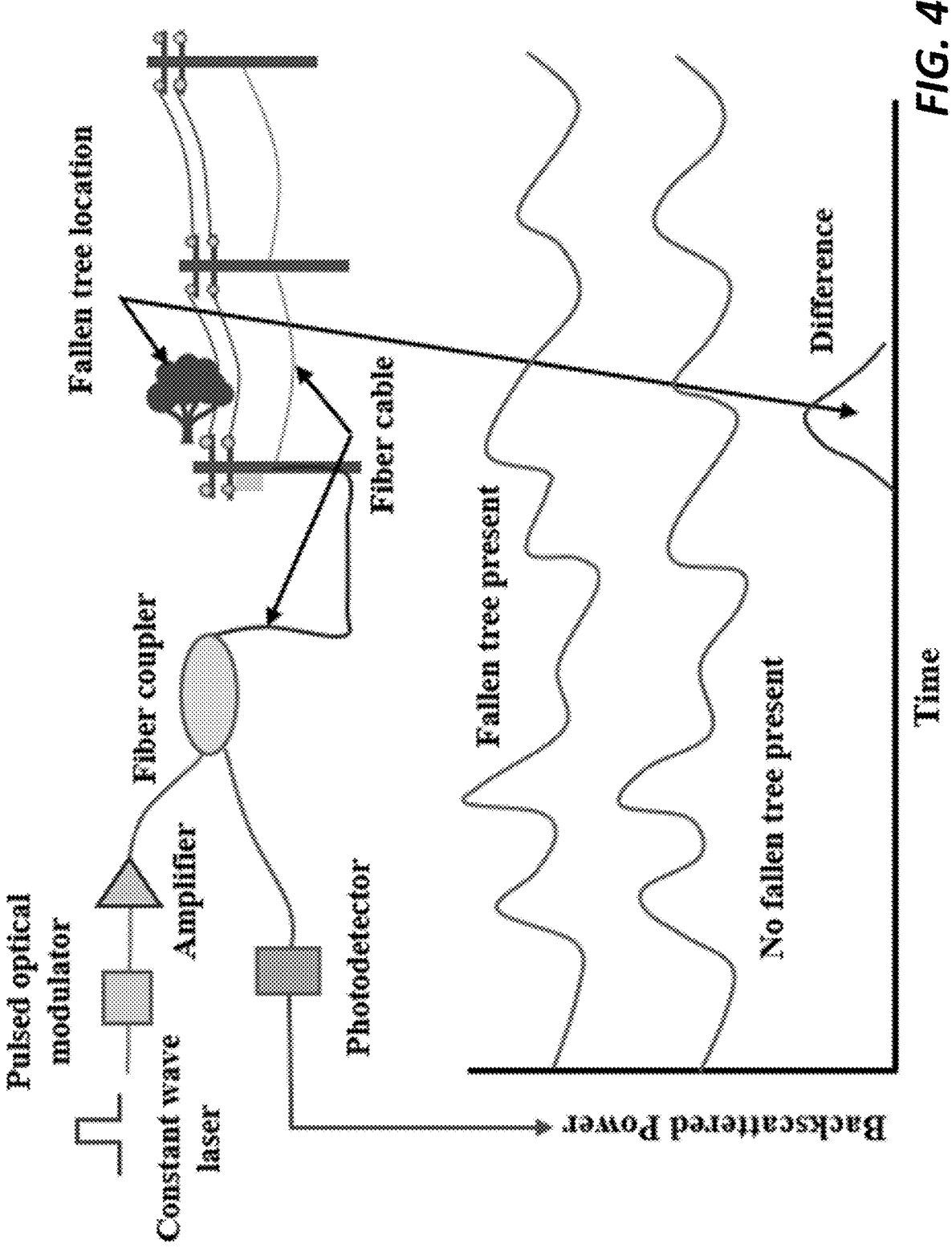
FIG. 4 is a schematic diagram showing illustrative distributed sensing used for fallen tree detection according to aspects of the present disclosure.

FIG. 4 is a schematic diagram showing illustrative distributed sensing used for fallen tree detection according to aspects of the present disclosure.

As illustrated in FIG. 4, light wave from a constant wave laser is gated into one end of the optical sensor fiber (typically located in a control room or central office) via a pulsed intensity modulator, and the backscattered light from the fiber is monitored with a photodetector. When a tree falls onto the power line (or a fiber cable), it will generate strong vibration, which will change the propagation phase of probe laser pulse. Assumed that, the fiber axial strain is $\varepsilon$ from external vibration such as from a fallen tree striking the cable. The corresponding change of fiber refractive index $n_0$ is:

$$\Delta n_{eff} = \gamma n_0 \varepsilon \tag{1}$$

where $\gamma$ is elasto-optical coefficient. Meanwhile, the fiber cable length/which is under vibration will also be modulated by vibration. The length change can be expressed as:

$$\Delta l = \varepsilon \cdot l \tag{2}$$

Thus, the phase change due to the external vibration can be expressed by:

$$\Delta \emptyset = (1 + \gamma) n_0 k l \varepsilon \tag{3}$$

According to Equation (3), the external vibration is proportional to the additional laser phase and can be measured quantitatively by phase demodulation. The time of arrival carries the information regarding the fallen tree location (relative the fiber cable) which is obtained by $$L_x = \frac{c \nabla \tau}{2n} \tag{4}$$

where $\nabla \tau$ is the time delay of the signals, c is the velocity of light travelling in vacuum Physics Informed AI Model Feature Extractions Based on Frequency Domain Decomposition (FDD)

An overhead distribution line or a telecommunications cable supported/suspended by utility poles exhibits a sag caused by the combined effect of tension and gravity. When the cable vibrates at natural frequencies, the vibration waveform of the conductor is like the vibration of a string.

Figure 5:
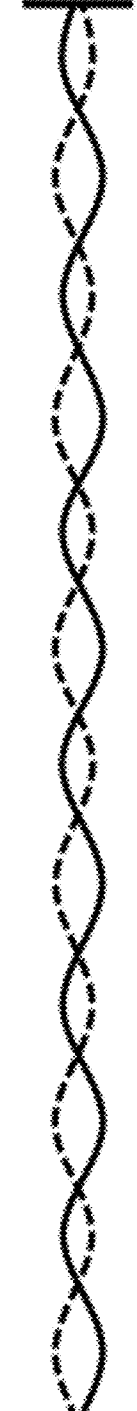
FIG. 5 is a schematic diagram showing an illustrative conductor vibration model according to aspects of the present disclosure.

FIG. 5 is a schematic diagram showing an illustrative conductor vibration model according to aspects of the present disclosure.

FIG. 5 illustrates the vibration waveform of the conductor between two poles. When a tree crashes into a cable, it will introduce changes in structural intrinsic parameters such as natural frequency, and the structural vibration signals collected by distributed fiber sensing contain substantial physical parameters information. In this work, the change of the natural frequency of the telecom cable is used to evaluate whether the tree falls onto the powerline or falls onto an aerial cable.

Traditionally, an experimental modal analysis (EMA), typically performed in a laboratory with highly controlled boundary conditions to obtain the natural frequency of the structure. However, this is not suitable in the case of fallen tree excited vibration since the real-world operational conditions differ significantly from laboratory conditions and the system is too large to be tested in a lab. To solve this issue, we propose frequency domain decomposition (FDD) which is a response-only technique, meaning no input forces are necessary to calculate the natural frequency of the system. Consider the response vector Y(t) given as sum of the modal contributions of n vibration nodes:

$$Y(t) = \sum_{r=1}^{n} u_r q_r(t) = UQ(t) \tag{5}$$

where $u_r \in R^{N_0 \times 1}$ are the normal mode shape vectors and $q_r(t) = e^{\lambda_r t}$ is the uncorrelated modal coordinates, $U = [u_1 \ u_2 \ \ldots \ u_n] \in R^{N_0 \times n}$ is the normal mode shape matrix and $Q^T(t) = \{q_1(t) \ q_2(t) \ \ldots \ q_n(t)\} \in C^{n \times 1}$ a column vector containing the modal coordinates. From the modal decomposition of correlation function with normal modes, we can derive the following expression:

$$R_{yy}(\tau) = E[Y(t)Y^t(t+\tau)] = UE[Q(t)Q^T(t+\tau)]U^T = UR_{qq}(\tau)U^T \tag{6}$$

where $R_{qq}(T) \in R^{N_0 \times N_0}$ is the correlation matrix of the modal coordinates. Taking the Fourier Transform of (6), which yields the Power Spectral Density (PSD) matrix:

$$G_{yy}(f) = UG_{qq}(f)U^T \tag{7}$$

where $G_{qq}(f) \in C^{N_0 \times N_0}$ is the PSD of the modal coordinates which is a diagonal matrix with positive values. Equation (7) can be further represented by the auto spectral densities:

$$G_{yy}(f) = U[g_0^2(f)]U^H \tag{8}$$

where $$g_0^2(f) \in R^+$$

is the auto spectral densities of $G_{qq}$. By taking the Singular Value Decomposition (SVD), Eqn. (8) can be deposed as:

$$G_{yy}(f) = VSV^H = V[s_0^2(f)]V^H \tag{9}$$

where $V = [v_1 \ v_2 \ \ldots \ v_{N_0}] \in C^{N_0 \times N_0}$ is an orthogonal matrix containing the singular vectors $v_{N_0}$ and S is a diagonal matrix containing the singular values $$s_0^2(f).$$

Comparing Eqs. (8) and (9), it follows that the singular values $$s_0^2(f)$$

can be interpreted as auto spectral densities of the modal coordinates and the singular vectors $v_{N_0}$ as the corresponding singular vectors. The identification of the natural frequencies with FDD is carried out as follows: (1) first, the SVD of the PSD matrix at each frequency line is computed according to Eq. (9); (2) then the computed singular values are plotted against their corresponding frequency lines; (3) next, the natural frequencies are estimated by simply picking the peaks at plotted singular values.

ResNet Model

Figure 6:
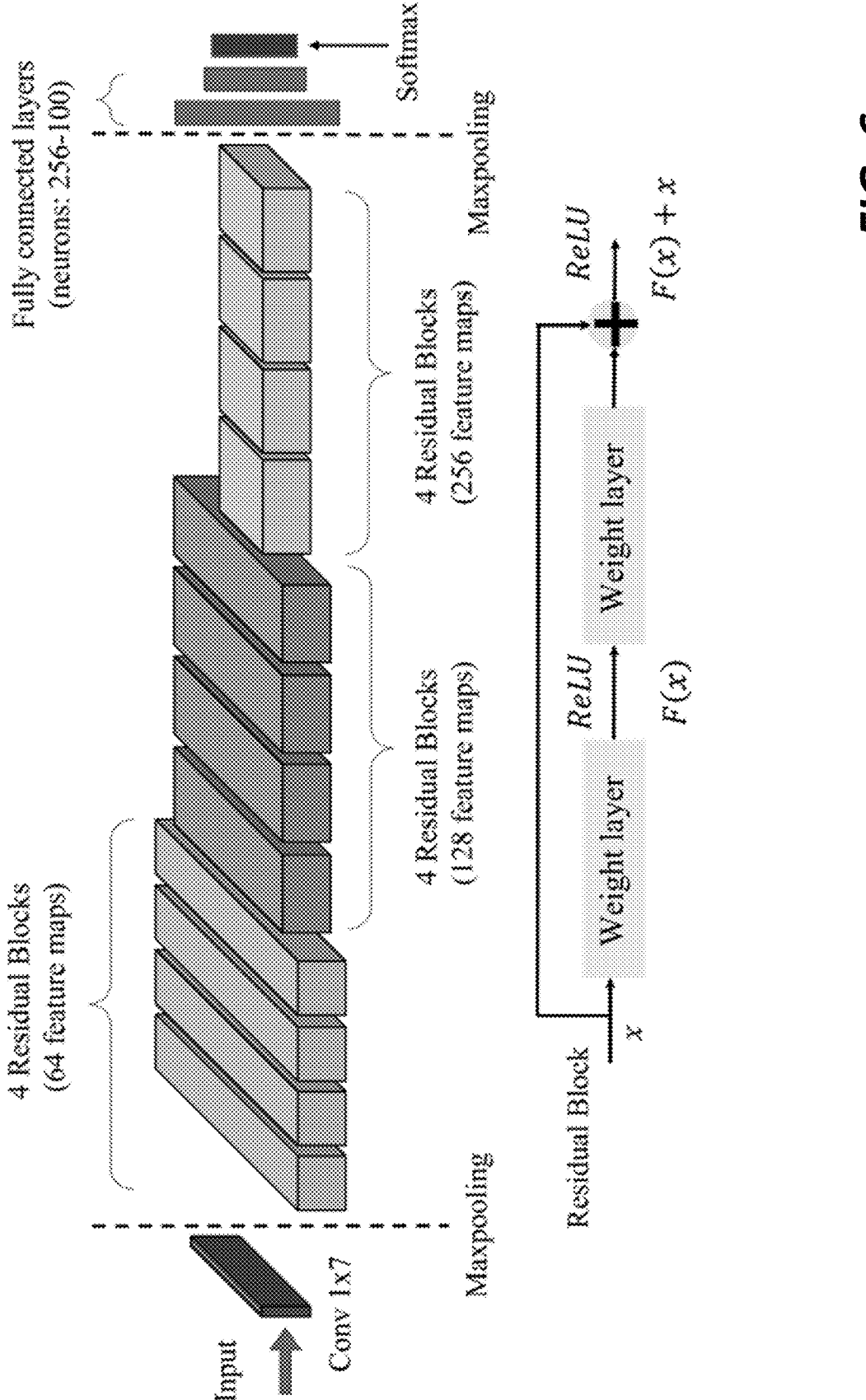
FIG. 6 is a schematic diagram showing an illustrative ResNet model for fallen tree detection according to aspects of the present disclosure.

In this step, feature extraction and fallen tree detection are performed on SVD singular sequence using residual convolution block. The decomposed singular signal contains discriminative features, and it can be directly used for detection. To mine the representative features of the data for more reliable detection, a ResNet network is employed as shown in FIG. 6 which is a schematic diagram showing an illustrative ResNet model for fallen tree detection according to aspects of the present disclosure.

The ResNet contains a convolutional layer (Cony), two max-pooling layers, twelve 1-D residual blocks (RB) and two fully connected layers (FC). The residual block is the key module for each channel and made up of a set of learnable filters. Each filter performs a convolutional operation based on the filter size to obtain the dot product between the filter entry and any position input in a forward pass. As the filter slides across the length of the 1-D input, a feature map is generated that represents the filter's response at each spatial location. Then the generated feature maps can be stacked along the depth dimension to form the output. Note our ResNet structure is like a "standard" ResNet18 architecture except for the last four convolutional layers in ResNet18, which are replaced by two fully connected layers. Comparisons with several variants of ResNet18 show that additional convolutional layers at the end of ResNet18 do not contribute to accuracy enhancement, while adding more fully connected layers enables a significant improvement in prediction performance. The configuration details of the 1-D ResNet are given in Table 1.

TABLE I

CONFIGURATION DETAILS OF THE 1-D
RESNET FOR FALLEN TREE DETECTION

| Type | Filter/Input | Kernel | Stride | Pading |
|------|--------------|--------|--------|--------|
| Conv | 32 | 3 | 1 | 1 |
| RB 1-4 | 64 | 3 | 2 | 1 |
| RB 5-8 | 128 | 3 | 2 | 1 |
| RB 9-12 | 256 | 3 | 2 | 1 |
| FC 1 | 100 | N/A | N/A | N/A |
| FC 2 | 10 | N/A | N/A | N/A |

(GUI) For Visualization and Reporting

The GUI provides the fallen tree location in terms of the fiber cable length and pinpoints the exact cable (primary wire or fiber cable) that the fallen tree strikes onto. Once a fallen tree is detected, an alarm will be triggered and the results will be sent over to the end-user via email, text message and an automated phone call.

Fallen Tree Localization—an Example Case

Data Collection Experiments

We built a real-scale testbed comprised of 3 wooden utility poles connected by electric power lines and aerial fiber cables to conduct the experiments. The wooden poles are class II, 35 feet (~10 m) in overall length, and spaced 90 feet (~27 m) apart in a linear manner.

Figure 7:
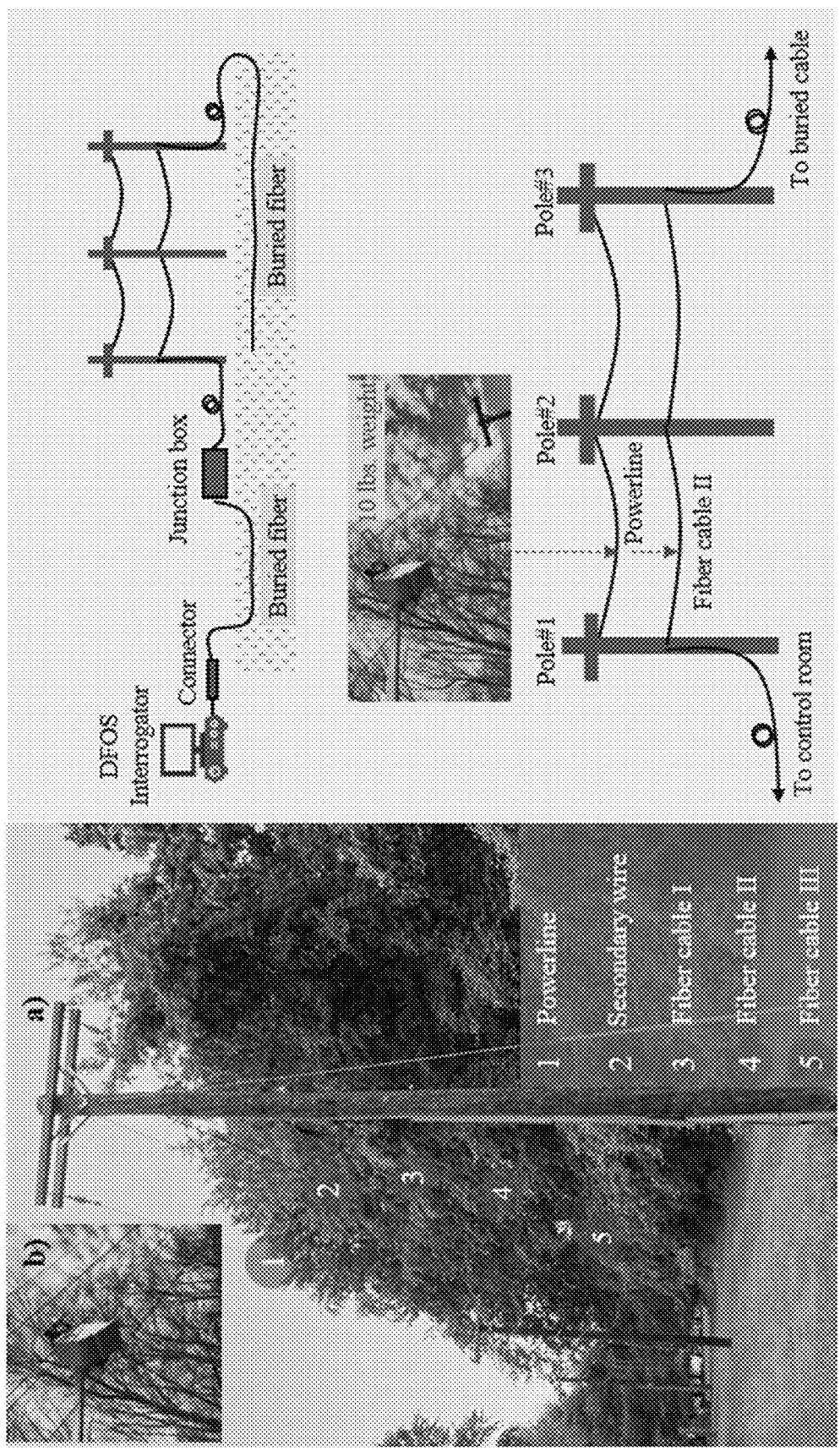
FIG. 7 is a schematic photo-illustration showing illustrative experimental setup for fallen tree detection and localization including pole and cable layout; test setup for fallen tree localization; weight dropping test and weight dropping test signal collected by DFOS according to aspects of the present disclosure.

FIG. 7 is a schematic photo-illustration showing illustrative experimental setup for fallen tree detection and localization including pole and cable layout; test setup for fallen tree localization; weight dropping test and weight dropping test signal collected by DFOS according to aspects of the present disclosure.

As depicted in that figure, there are five layers of cables are supported by the poles. The top two layer are dummy electric wires, and the rest three layers are optical fiber cables. Our real-time DFOS interrogator has a sensing range of over 120 km. The DFOS interrogator is shown located in a control room and connected to 300 m buried fiber cable to an outdoor junction box, which was then connected to the fiber cable II as shown in FIG. 7. The optical pulse width of the DAS setup was selected as 8 ns, and a pulse repetition rate of 20 kHz. The spatial resolution was set to 1.232 m, which means we can have 27/1.23222 sensing points between pole #1 and pole #2.

To emulate the fallen tree on the cable, we drop a 10 lbs. weight to the primary wire as shown in the figure. In a real-world scenario, a downed tree could also fall onto the fiber cables, which will also cause vibration that can be detected by the DFOS interrogator. Therefore, to localize whether the tree falls onto primary wire or the fiber cable, we also drop a 10 lbs weight onto the fiber cable II as illustrated in the figure. We repeated the weight dropping tests 10 times, respectively on primary wire and fiber cable II, and recorded corresponding vibration data from DFOS interrogator. The vibration signal received when the weight fell onto the primary wire and fiber cable II was presented in the figure. As can be seen from the recorded vibration signals, it is difficult to differentiate by human eyes, thus we develop machine learning model for this localization purpose. To summarize, the DFOS measurements were conducted for three test conditions: (1) ambient condition with no weight dropping; (2) 10 lbs. weight dropping onto primary wire; (3) 10 lbs. weight dropping onto fiber cable II The aerial fiber optic cable supported by the pole is a 36-strand single-mode outdoor figure-8 cable with a 0.25-inch messenger. A weather station was installed on the first pole to record rain intensity under three categories, which include light rain, moderate rain, and heavy rain. In this experiment, ambient defines either cloudy or sunny weather conditions. The DAS interrogator was located inside a control room approximately 560 meters away from the last pole in terms of fiber length. The optical pulse width of the DAS setup was selected as 8 ns, and a pulse repetition rate of 20 kHz was used for data collection.

Obtain SVD for Each Test

We collect the vibration data under ambient, weight on primary wire and weight on fiber cable II. Each dataset is a 2.5-minute-long time series data and a total of 390 datasets are collected for 13 sensing points. Then we calculate the SVDs for the 13 sensing points and select the first SVD line as input data for our data. As a result, we have a total of 30 SVDs under the three testing conditions. For the weight test on primary wire and fiber cable II, we use the first 5 tests of each for training, the other 5 tests of each for testing.

Figure 8A:
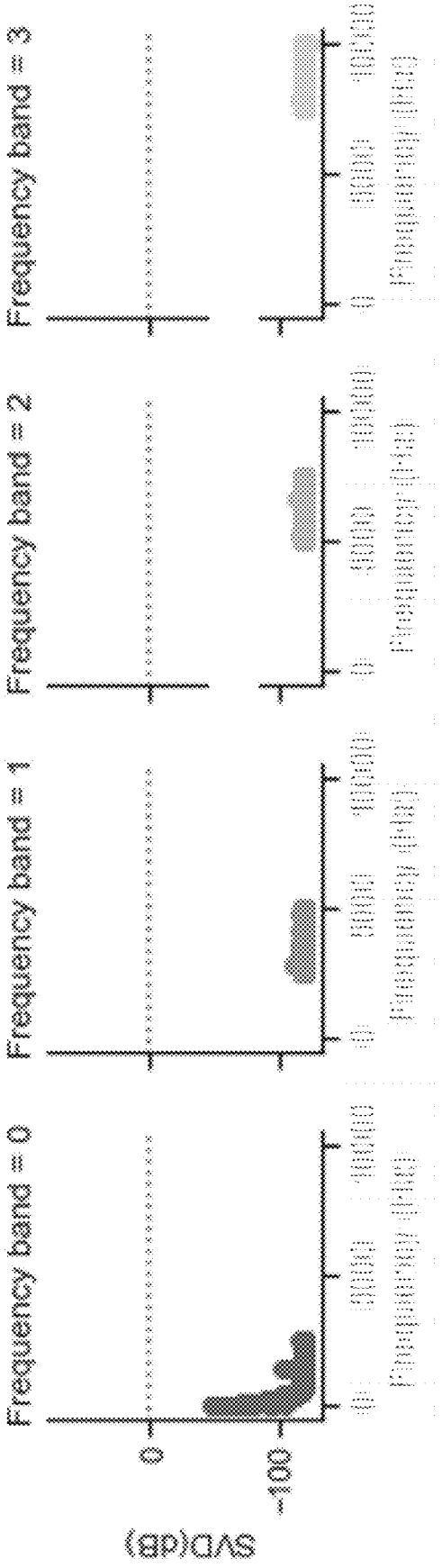
Figure 8B:
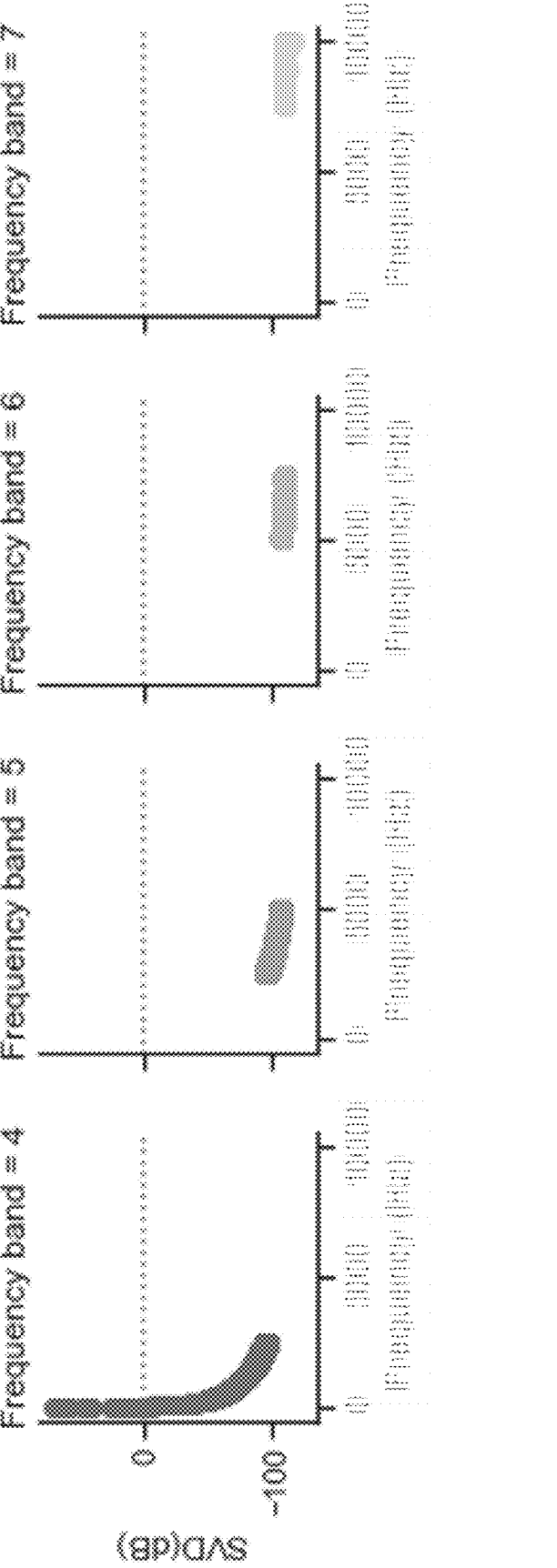
Figure 8C:
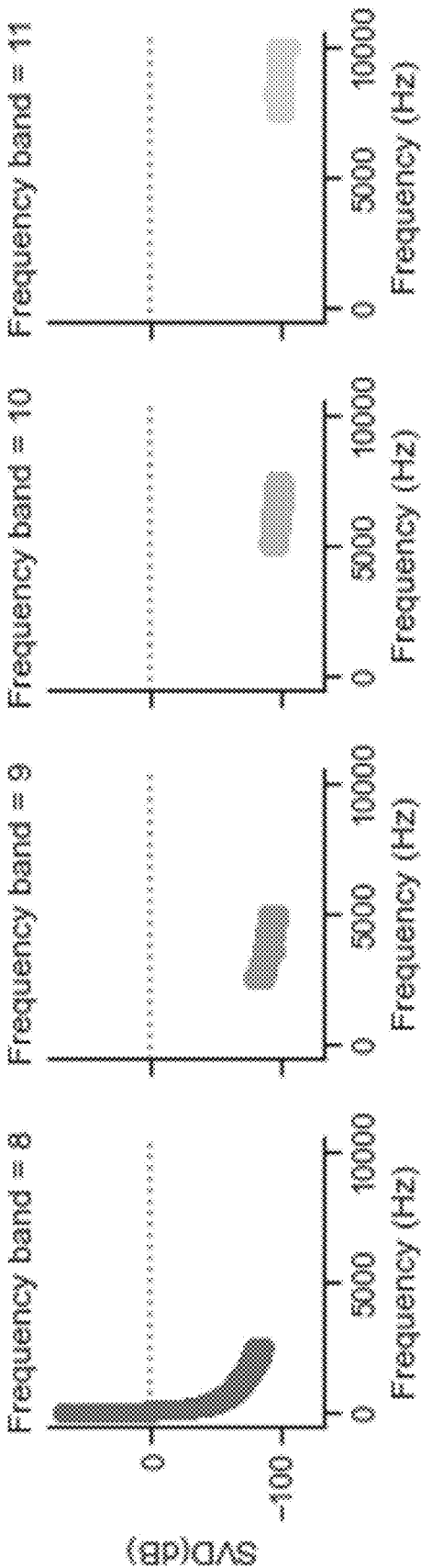

FIG. 8(A), FIG. 8(B), and FIG. 8(C) are a series of test plots showing singular value decomposition (SVD) for each testing for: FIG. 8(A) ambient, FIG. 8(B) primary wire, and FIG. 8(C) aerial fiber cable II according to aspects of the present disclosure.

Physics Informed AI Results

In this section, we aim to verify the performance of proposed solution on fallen tree detection using the collected field data. A weight dropping test generates a time series matrix, we first conduct a SVD frequency component decomposition to obtain the frequency singular values of the matrix. The frequency singular sequence has 10,000 frequency components, corresponding to frequency range 0~10,000 Hz. Considering the 10,000-length sequence is too long for machine learning model, we separate the sequence into small singular segments with length 100. In the end, a preprocessed dataset contains 1,500 instances that across all the frequency range are generated for model training We further divide the dataset into training, validation, and testing sets with ratio 60%, 20%, 20%, respectively. Besides, we also investigate how the different frequency ranges of singular segments used as input would influence the fallen detection performance. We split the frequency range into three parts equally: 0~3333 Hz, 3333~6666 Hz, and 6666~9999 Hz. Those three ranges are named low frequency, mid frequency, and high frequency. Considering the length of each frequency range is smaller than all frequency, as a result the number of input instances extracted from partially frequency range also decrease significantly. Here we use an overlapped slide window to generate the input instances. For example, given the low frequency range, a window length of 100 slides through the whole sequence with moving step 25. In the end, three additional datasets that contain 1,800 instances each are generated. To conduct the experiments, we use the Adam optimizer with a learning rate 0.00005 and train the framework for 500 iterations

TABLE II

PERFORMANCE OF ALL FREQUENCY, LOW FREQUENCY, MID FREQUENCY AND HIGH FREQUENCY INPUT FOR FALLEN TREE EVENT CLASSFICATION.

| Input type | Accuracy | Precision | Recall |
|---|---|---|---|
| All frequency input | 0.949 | 0.924 | 0.932 |
| Low frequency input | 0.928 | 0.901 | 0.913 |
| Mid frequency input | 0.984 | 0.977 | 0.972 |
| High frequency input | 0.975 | 0.969 | 0.977 |

Table II gives the performance of all frequency, low frequency, middle frequency, and high frequency as input for fallen tree event classification. As we can see, all the classification accuracies are over 90%, indicating the proposed solution successfully extract representative features from each category. We can observe that middle and high frequency input achieve better accuracy than low frequency. It is different from physics domain knowledge that vibration frequencies are retained in the low frequency. The main reason is because the low frequency contains many vibration patterns excited by random ambient noises, such as wind and nearby traffic. As a result, the extracted features from low frequency range also contaminated by ambient noises, which would be harmful for detecting the fallen events. On the other hand, the middle and high frequency range does not contain ambient noise and the extracted features are distinguishable for different fallen locations, leading to a better detection performance.

Figure 9:
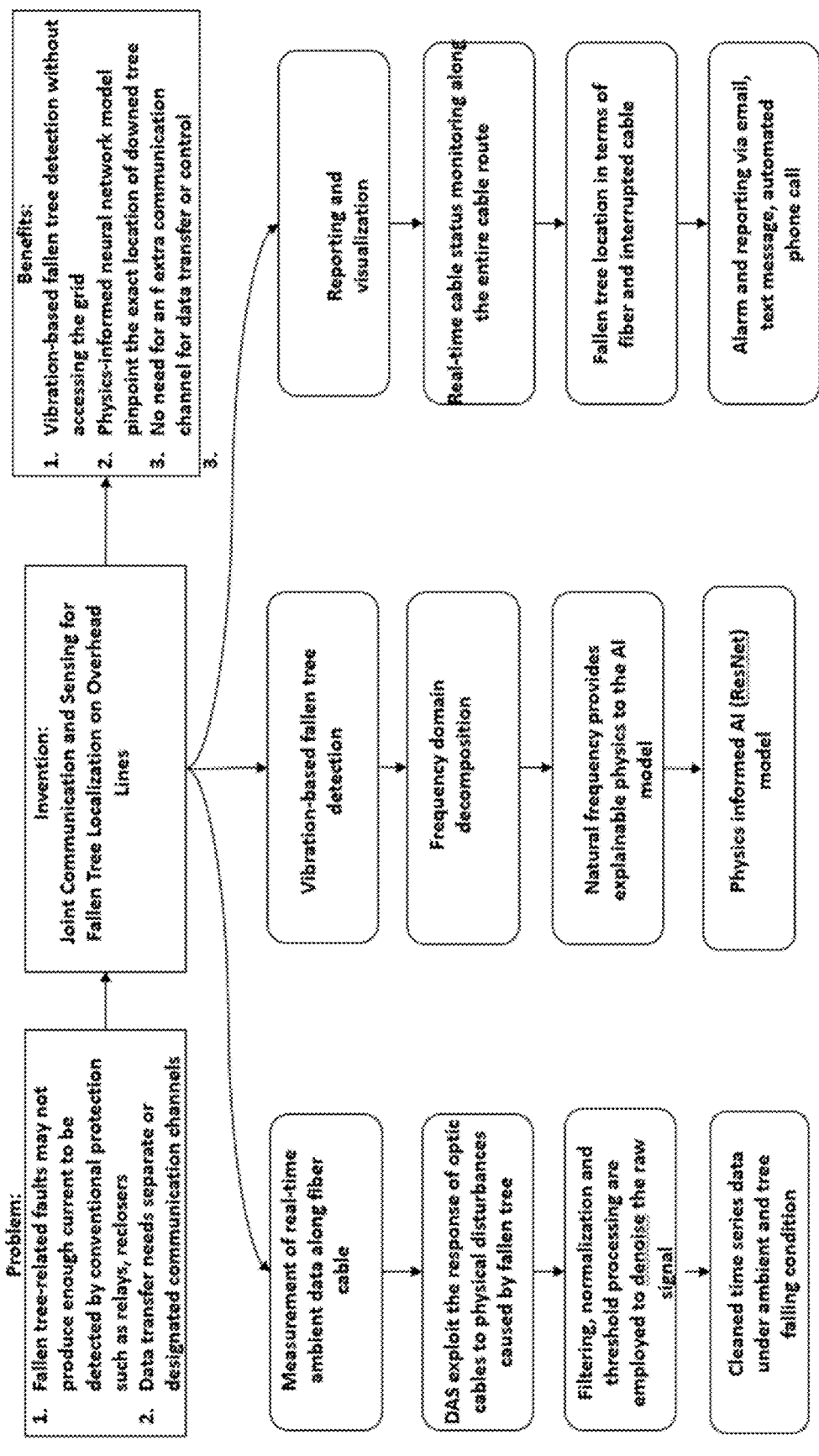
FIG. 9 is a schematic block diagram showing illustrative features ensemble approach robust to outliers according to aspects of the present disclosure.

FIG. 9 is a schematic block diagram showing illustrative features ensemble approach robust to outliers according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A fallen tree localization method comprising:
operating a distributed fiber optic sensing (DFOS) system configured to receive vibration data of overhead transmission and distribution lines;
analyzing the vibration data using frequency domain decomposition (FDD) techniques, producing identification of natural frequencies of the overhead transmission and distribution lines;
performing a Singular Value Decomposition (SVD) on a Power Spectral Density (PSD) matrix obtained from the FDD analysis, generating a singular sequence containing discriminative features;
performing a feature extraction and fallen tree detection by using a residual convolution block to process the singular sequence;
determining the fallen tree location and overhead line onto which the fallen tree has fallen; and
reporting the fallen tree occurrence, location, and overhead line affected.

2. The method of claim 1 wherein the residual convolution block is included in a ResNet network.

3. The method of claim 2 wherein the natural frequencies are determined by FDD techniques by determining a Singular Value Decomposition (SVD) of a Power Spectral Density (PSD) matrix, plotting singular values against corresponding frequency lines, and estimating the natural frequencies from the plotted singular values.

4. The method of claim 3 wherein the ResNet network includes a convolutional layer, two max-pooling layers, twelve 1-D residual blocks and two fully connected layers.

5. The method of claim 4 wherein the ResNet network residual blocks include a set of learnable filters configured to perform a convolutional operation based on the filter size.

* * * * *